United States Patent [19]
Konuma et al.

[11] Patent Number: 5,784,129
[45] Date of Patent: Jul. 21, 1998

[54] ELECTRO-OPTICAL APPARATUS UTILIZING ELECTRO-OPTICAL MODULATING DEVICES TO PROVIDE A SYNTHESIZED COLOR IMAGE

[75] Inventors: Toshimitsu Konuma, Kanagawa; Akira Mase, Aichi, both of Japan

[73] Assignee: Semiconductor Energy Laboratory Company, Ltd., Kanagawa-gen, Japan

[21] Appl. No.: 572,105

[22] Filed: Dec. 14, 1995

Related U.S. Application Data

[62] Division of Ser. No. 912,335, Jul. 13, 1992, Pat. No. 5,481,320.

[30] Foreign Application Priority Data

Jul. 12, 1991 [JP] Japan ................................. 3-198941
Jul. 12, 1991 [JP] Japan ................................. 3-198942

[51] Int. Cl.$^6$ ............................................. H04N 9/12
[52] U.S. Cl. ................. 348/739; 348/749; 348/777; 348/790; 349/33; 349/64; 349/27
[58] Field of Search .................... 348/742, 750, 348/751, 757, 758, 777, 748, 756, 790, 739–740; 359/40; 345/99; 349/27, 33, 16, 64, 181; H04N 9/31, 5/74, 9/12, 9/16

[56] References Cited

U.S. PATENT DOCUMENTS

| | | | |
|---|---|---|---|
| 3,781,465 | 12/1973 | Ernstoff et al. | 358/61 X |
| 4,019,807 | 4/1977 | Boswell et al. | 359/72 |
| 4,127,322 | 11/1978 | Jacobson et al. | 353/37 |
| 4,150,876 | 4/1979 | Yevick | 350/338 |
| 4,299,447 | 11/1981 | Soltan et al. | 350/334 |
| 4,566,029 | 1/1986 | Johnson | 358/50 |
| 4,748,510 | 5/1988 | Umezawa | 358/236 |
| 4,786,146 | 11/1988 | Ledebuhr | 358/60 |
| 5,313,321 | 5/1994 | Yamamoto et al. | 359/77 |
| 5,528,257 | 6/1996 | Okumura et al. | 345/99 |
| 5,537,258 | 7/1996 | Yamazaki et al. | 359/634 |

*Primary Examiner*—Glenton B. Burgess
*Attorney, Agent, or Firm*—Sixbey, Friedman, Leedom & Ferguson; Gerald J. Ferguson; Evan R. Smith

[57] ABSTRACT

An electro-optical device includes a light amplifying portion comprising a first substrate having a transparent conductive film, a photoconductor whose electric resistance is lowered in accordance with light irradiation and a dielectric thin film, a second substrate having a transparent conductive film and a uniaxially orienting mechanism and a ferroelectric liquid crystal or antiferroelectric liquid crystal layer sandwiched between the first and second substrate, an image write-in portion comprising a display body, a mirror for splitting an image light into three color lights and light shutters for performing a switching operation between transmission and interception of the split lights, and serves to irradiate the image light through the first substrate of each light amplifying portion, an image read-out portion comprising a light source for irradiating light through the second substrate of each of the three light amplifying portions, and red, green and blue color filter portions, and an imaging portion for synthesizing image lights transmitted through the image read-out portion and reflected from the light amplifying portions into a synthesized image.

16 Claims, 9 Drawing Sheets

ELECTRO-OPTICAL APPARATUS UTILIZING ELECTRO-OPTICAL MODULATING DEVICES TO PROVIDE A SYNTHESIZED COLOR IMAGE

This is a Divisional application of U.S. patent application Ser. No. 07/912,335, filed Jul. 13, 1992 now U.S. Pat. No. 5,481,320.

BACKGROUND OF THE INVENTION

1. Field of the Invention

This invention relates to an electro-optical device such as a television receiver and a driving method therefor in which an image or picture is formed on the basis of video signals which are transmitted from a television broadcasting station on earth, a satellite broadcasting station, a community antenna television system (CATV) station, or an individually-disposed recording device for a television picture (e.g., a video deck, a laser disk, a photoelectro-magnetic disk, etc.), and particularly to an image display device such as a television receiver and an image display method therefor in which an original image (picture) is substantially amplified to form an image with high contrast ratio and brightness even in a wide screen.

2. Description of Related Art

An image display system such as a Braun tube or a cathode-ray tube (CRT) in which an electron beam is irradiated to a phosphor screen in accordance with a video signal in a vacuum tube to induce the emission of the phosphor screen, has been conventionally utilized as a display device for displaying an image or picture on the basis of video signals which are transmitted from a television broadcasting station on earth, a satellite broadcasting station, a community antenna television system (CATV) station, or an individually-disposed recording device for a television image (e.g., a video deck, a laser disk, a photoelectro-magnetic disk, etc.). At the initial stage, a display device having a screen of 12 to 14 inches of width across corners thereof (hereinafter referred to as "12 to 14-inch wide screen") had mainly propagated. However, a display device having a 20-inch to 30 or more inch wide screen is now in the market to satisfy the recent requirement.

The display device having the 30-inch wide screen is approximately 30 inches in depth, and glass material constituting the screen thereof is designed so as to have thickness above 1 inch to keep its strength.

As another type of display device has been proposed a display system having a high-brightness Braun tube in which an image (picture) on the Braun tube is enlarged through an optical system and then displayed on a screen. This type of display system has been used for a display device having a large display (projection) area.

In a television receiver using a Braun tube, the total weight thereof exceeds 100 kg when the display screen thereof exceeds 30 inches in width across corners. When such a television receiver of 100 kg or more in weight is placed on a general home, the place position of the television receiver on the home is restricted because of its weight, and it is also difficult to move the television receiver by human power when alteration of layout of the television receiver is required. This inconvenience of the television receiver has obstructed the propagation of a large-size television receiver into the general home.

In order to avoid the above disadvantage due to the weight of the television receiver, a projection type television receiver has been proposed. However, an original high-brightness Braun tube which has been generally used in the projection type television receiver also has restriction in improvement of its brightness, and the brightness of an enlarged image (picture) itself is very low, so that the screen of this type television receiver is dark. In addition, since an image (picture) is enlarged by the optical system, the contrast ratio is high for a front-side view, however, it is still lower for a slant-side view in this projection system than in the Braun tube system. Although many kinds of projection type television receivers adopting a TFT panel are also produced, the yield of this type of television receiver in manufacture can not be improved because a manufacturing process thereof is complicated, and thus the commercial success has not yet obtained for this type television receiver.

Further, a color liquid crystal projection type of television receiver has been also developed. However, since this type of television receiver requires as a display body three or more active matrix type liquid crystal display devices having complicated wiring patterns, the yield thereof is still lower. Therefore, this type television receiver has a critical problem that the manufacturing cost is increased.

SUMMARY OF THE INVENTION

An object of this invention is to provide an electro-optical device and a method of driving the electro-optical device which can provide an image with high brightness and contrast ratio even using a large-size screen.

Another object of this invention is to provide a projection type of television receiver including one display body, three high-speed liquid crystal shutters and one or three liquid crystal cells having a light-amplifying function with high performance and high brightness.

According to one aspect of this invention, a television receiver has the following constructive elements.

(1) Three light amplifying portions (light amplifiers) each including a first substrate which comprises a transparent conductive film, a photoconductor having a photosensitive characteristic that electric resistance thereof is lowered (decreased) in response to light incident thereto and dielectric thin film for shielding or reflecting incident light, a second substrate which comprises a transparent conductive film and uniaxially-orienting means (orientation control means), and a ferroelectric or antiferroelectric liquid crystal layer sandwiched between the first substrate and the second substrate.

(2) An image write-in portion including one display body for displaying an image, a mirror body for splitting (distributing) light of the image into three image lights (three light components) in three directions and light shutters for performing a switching operation between the transmission and interception of the split image lights, each of the image lights being written into the corresponding light amplifying portion through the first substrate side thereof.

(3) An image read-out portion including a light source and a polarizer for irradiating light through the second substrate side of each of the light amplifying portions, an analyzer for receiving the reflected light, and color filter portions of red, green and blue which are disposed in correspondence to the light amplifying portions respectively and through which the light to be irradiated through the second substrate side is spectroscopically separated (color-filtered).

(4) An imaging portion for synthesizing the reflected image lights from the light amplifying portions which correspond to the red (R), green (G) and blue (B) images and passed through the image read-out portion to form a synthesized image.

Embodiments having the above four constructive elements according to this invention will be hereunder described together with detailed description of each of the constructive elements.

Figure 1:
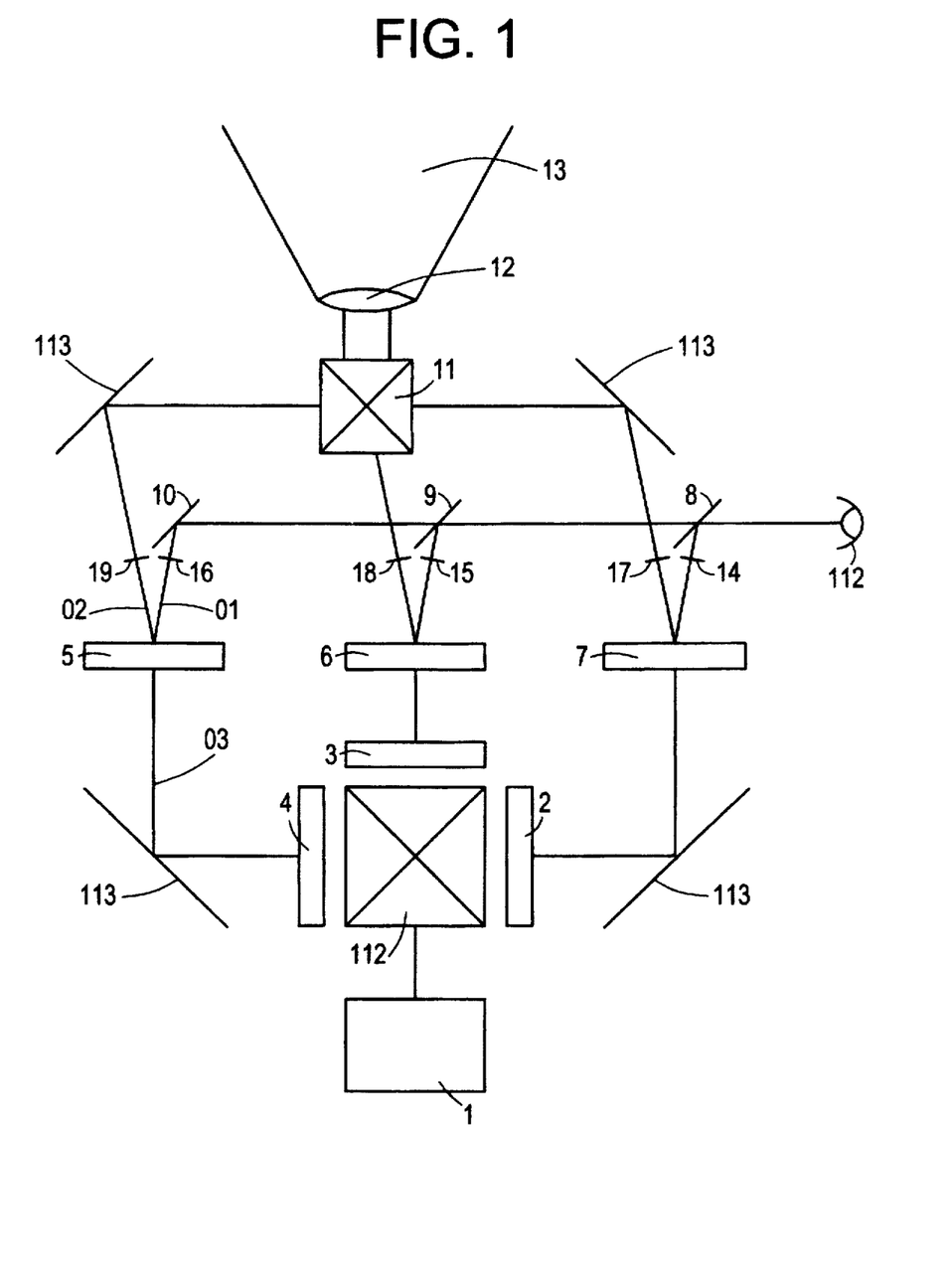
FIG. 1 shows the construction of an embodiment of a television receiver according to this invention.

FIG. 1 shows the schematic construction of a first embodiment of a television receiver of this invention. In FIG. 1, a display body 1 for displaying a television image (picture) serves to successively form each of red, green and blue images. An image light emitted from the display body 1 is separated into three lights by a mirror body 112, one of the three lights is selected through a shuttering operation of light shutters (optical shutters) 2, 3 and 4 (that is, a switching operation between transmission and interception of each of the three lights (red, green and blue image lights) is carried out by the light shutters 2, 3 and 4), and then the selected one of the three lights which is passed (transmitted) through one of the light shutters 2, 3 and 4 is supplied to the corresponding one of light amplifiers 7, 6 and 5, respectively and incident on the corresponding one of the first substrates of the three light amplifying portions.

As the display body 1 may be used a CRT (cathode ray tube), a multiplex-driven liquid crystal panel having a light source at the back side thereof, an electroluminescence panel, a plasma display or the like. The display body 1 is used to merely emit an image light, so that it is not necessary to be a color display, but may be a white-and-black display or a bicolor display.

As the light shutter may be used ferroelectric liquid crystal panel or a dispersion type liquid crystal panel. Each of the color image lights of red, green and blue (R, G and B) from the display body is supplied as a write-in signal to the corresponding one of the light amplifying portions 5, 6 and 7.

In FIG. 1, the number of the light amplifying portions to be used is set to three because the three color (red(R), blue(B) and green(G)) images are synthesized to obtain a color image. However, four or more light amplifying portions may be used to form a color image, or other color images may be synthesized to form a color image.

Figure 2:
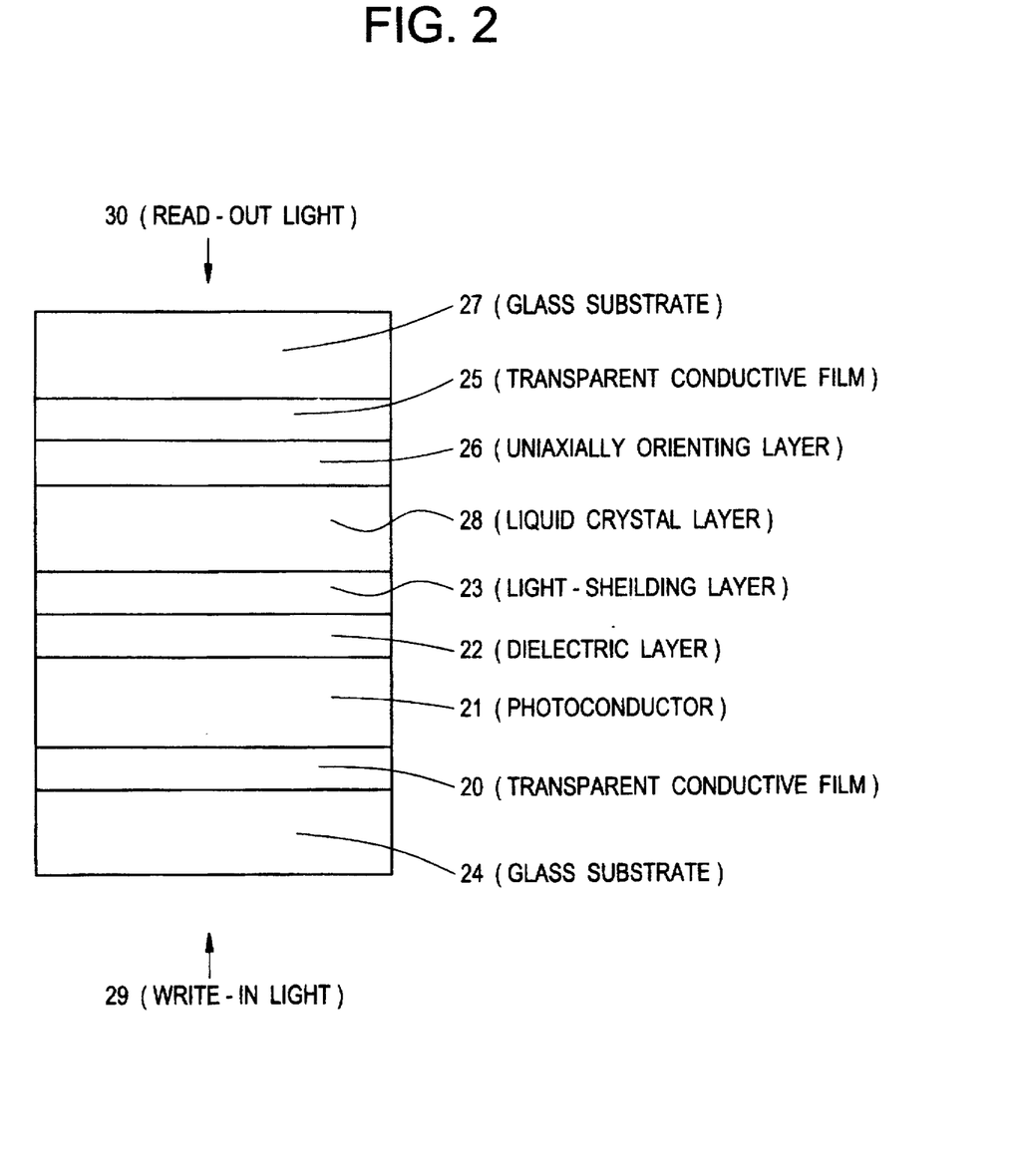
FIG. 2 shows the construction of a light amplifying cell used in the television receiver as shown in FIG. 1.

FIG. 2 shows the schematic construction of the light amplifying portions 5, 6 and 7.

In FIG. 2, each of the light amplifying portions 5, 6 and 7 includes a first substrate which comprises a transparent conductive film 20 formed on a glass substrate 24, a photoconductor 21 having a photosensitive characteristic that electric resistance thereof is lowered (decreased) in accordance with light incidence thereto, a dielectric layer 22 which is formed on the photoconductor 21 and serves to reflect light and a light-shielding layer 23 formed on the dielectric layer 22, a second substrate which comprises a transparent conductive film 25 formed on a glass substrate 27 and orientation control means 26 (an uniaxially orienting layer 26 for uniaxially orienting ferroelectric or antiferroelectric liquid crystal) provided on the glass substrate, and a ferroelectric liquid crystal layer (electro-optical modulating layer) 28 sandwiched between the first substrate and the second substrate.

As shown in FIG. 2, a write-in light 29 and a read-out light 30 are irradiated to each light amplifying portion from both surface sides thereof, respectively. The read-out light 30 which is a color signal for each of the primary colors (R, G and B) is obtained by emitting light in a suitable light source such as a halogen lamp and then spectroscopically separating (filtering or distributing) the light into three color lights (three light components) of red, green and blue using a color filter comprising dichroic mirrors 8, 9 and 10 as shown in FIG. 1, and is irradiated to the corresponding one of the light amplifying portions.

In FIG. 1, reference numerals 03, 01 and 02 represent the write-in light, the read-out light and an image (picture) light to be actually projected. The light 02 corresponds to the light 01 which has been reflected from the light amplifying portion 5, and by converting the image (picture) contained in the write-in light 03 (29 in FIG. 2) into the light 02, the image of the light 03 which is supplied from the display body 1 is amplified and then the amplified image is projected as the light 02.

The above description pertains to one of the color signals for the primary colors R(red), G(green) and B(blue), however, the same description may be made to the other color signals.

In the television receiver thus constructed, both of the write-in light and read-out light are prevented from being transmitted through the light amplifying portion by the dielectric layer 22 and the light shielding layer 23. As shown in FIG. 2, the light having an image information which is emitted from the display body 1 as shown in FIG. 1, that is, the write-in light (signal) 29 is irradiated through the first substrate side (through the glass substrate 24) to lower the electric resistance of a light-incident portion of the photoconductor 21 to which the write-in light 29 is irradiated. The lowering of the electric resistance of the photoconductor 21 causes the liquid crystal to be switched at the light-irradiated portion, and the same image information as contained in the write-in light 29 is also formed in the liquid crystal layer 28 of the light amplifying portion.

Since the liquid crystal layer 28 is formed of ferroelectric liquid crystal, the television receiver of this embodiment has an excellent characteristic that an image which is once written at a write-in operation remains unerased (is stored) even during a non-write-in operation. This storing function of the write-in image can provide an effect which would be obtained by simultaneously using plural display bodies although one display body is actually used.

For example, when a color image is required to be displayed using one display body, the following display method has been conventionally adopted. That is, each of three color images of R, G and B is successively displayed on the display body, and a complete (final) color image is formed using an afterimage phenomenon of the three color (red, green and blue) images. On the other hand, by using the ferroelectric liquid crystal having an image storing property like this embodiment, the red, green and blue color images can be simultaneously synthesized to form a color image because each of the three color images (a previous image) remains unerased (is stored) after the write-in operation for the color image (R, G or B). In this embodiment, the intensity of the write-in light may be set to a value of 0.5 to 5.0 mW/cm$^2$.

After an image is formed in the liquid crystal layer 28, the read-out light 30 is irradiated to the liquid crystal layer 28 on which the image has been formed by the write-in signal 29, and the light is reflected from the liquid crystal layer 28 in accordance with the orientation direction of the liquid crystal (which is dependent on the image formed in the liquid crystal layer). Thereafter, the reflected light is passed through a polarizing plate (analyzer) to obtain the reflected light having the same image information as the image which has been written on the liquid crystal layer 28 by the display body. The reflected image lights of R, G and B thus obtained are synthesized by a half mirror 11, and then passed through an optical system 12 to form a video light (projection image light) 13.

In this case, the image light of the display body 1 as shown in FIG. 1 is not directly used as a final display (projection) image light, but the read-out light which is different from the image light and modulated by the image light of the display body 1 is used as the final display image light, so that an image having remarkably high brightness can be obtained as the final display image by selecting a suitable light source which provides primary color (R, G and B) lights each having sufficient light intensity and light amount.

In the foregoing description for the above embodiment, the term "light amplifying portion" is used for the reason why the light amount of the image light to be finally projected is remarkably higher than that of the display body 1, and substantial light amplification is performed through the light-to-light converting operation of the light amplifying portion as described above.

According to a second aspect of this invention, an image display method for a television receiver comprises the steps of irradiating image write-in lights for red, green and blue images to one surface of a liquid crystal layer while one of the write-in lights is transmitted by a light switching shutter to form a ferroelectric liquid crystal layer having the same image information as the image write-in lights, irradiating image read-out lights for red, green and blue images to the other surface of the ferroelectric liquid crystal layer to obtain reflected red, green and blue image lights, and synthesizing the reflected red, green and blue image lights to perform an image display operation.

In this invention, each of the lights which have red, green and blue image informations respectively are irradiated to one surface of the liquid crystal layers of the light amplifying portions for the red, green and blue images while the light-irradiating operation for each light is suitably controlled by each light shutter therefor to thereby form each of the red, green and blue images in the liquid crystal layer. In addition, red, green and blue lights which are obtained by spectroscopically separating light are irradiated to the other surface of the liquid crystal layer to thereby obtain reflected image lights corresponding to the red, green and blue images formed in the liquid crystal layer. The reflected red, green and blue image lights are synthesized to form a color projection image.

Ferroelectric liquid crystal (FLC) having high-speed responsibility and storing capability is preferably used for the liquid crystal layer, however, other types of liquid crystals such as nematic liquid crystal, dispersion type of liquid crystal may be used for the liquid crystal layer.

According to a third aspect of this invention, a video image from a display body having a low brightness is spectroscopically separated, and spectroscopically-separated image lights are selectively written in correspondence with primary color images on one surface of a liquid crystal cell on which an image can be written. In addition, spectroscopically separated read-out lights for three primary colors are irradiated onto the other surface of the liquid crystal cell from a light source and then reflected therefrom to read out the primary color images written in the liquid crystal cell. The read out images are synthesized to perform a color projecting operation with high brightness and high performance.

A CRT having low brightness which has been conventionally produced may be used as the display body, and the color projecting operation can be carried out while performing the light amplification. In addition, a TFT panel, an electroluminescence display, a plasma display or the like may be used as the display body.

Figure 5:
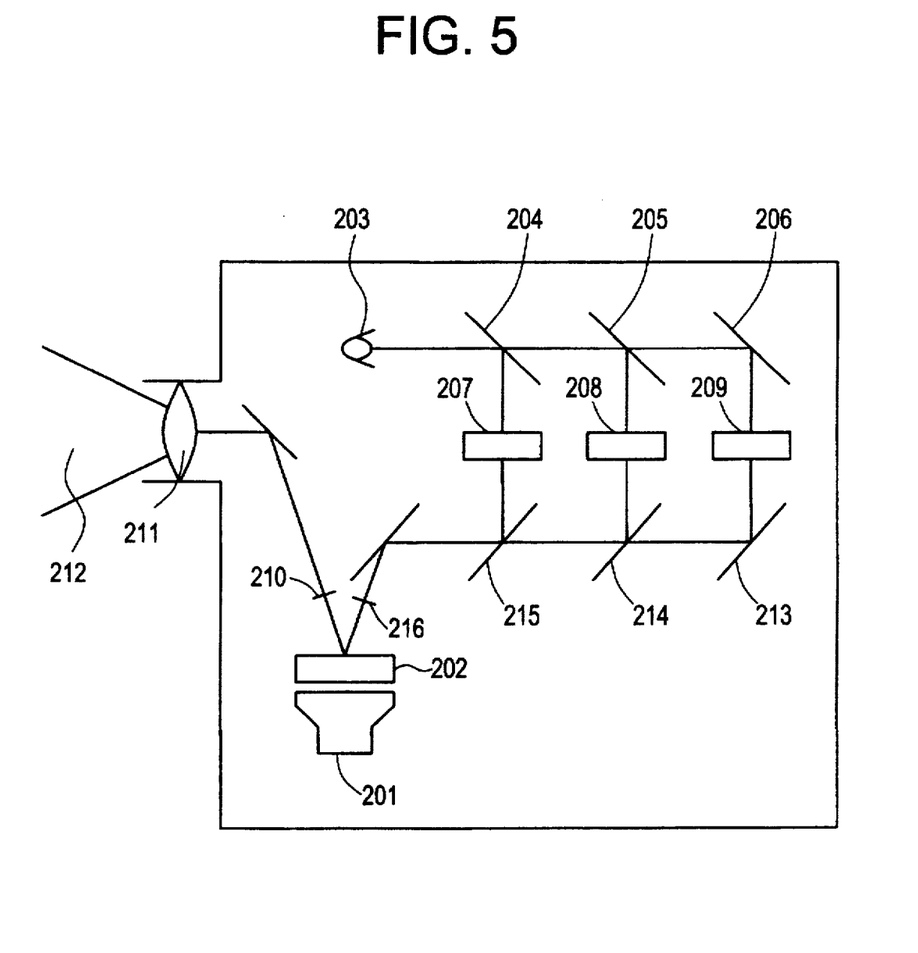
FIG. 5 shows the construction of another embodiment of the television receiver according to this invention.

FIG. 5 shows the schematic construction of another embodiment according to the third aspect of this invention. A display body 201 for displaying a video image for television serves to successively form red, blue and green images for a constant period. An image light emitted from the display body 201 is supplied to a light amplifying portion 202. The image light is incident on the glass substrate 24. As the display body may be used a CRT (cathode ray tube), a multiplex-driven liquid crystal panel having light source at the back side thereof, an electroluminescence panel, a plasma display or the like.

The display body of this embodiment serves to merely emit an image light, and thus it is not necessary to be a color image display. For example, it may be a white-and-black or bicolor display. The light of the display body is supplied to a cell of the light amplifying portion as a write-in signal.

The light amplifying portion of this embodiment has the substantially same construction as the first embodiment as shown in FIG. 2. That is, the light amplifying portion 202 includes a first substrate which comprises a transparent conductive film 20 formed on a glass substrate (transparent substrate) 24, a photoconductor 21 whose electric resistance is lowered (decreased) in response to incidence of light thereto, a dielectric layer 22 formed on the photoconductor 21 for reflecting the incident light and a light shielding layer 23, a second substrate which comprises a transparent conductive film 25 formed on a glass substrate (transparent substrate) 27 and an orientation control means 26 (uniaxially-orienting film 26 for orienting ferroelectric or antiferroelectric liquid crystal in an uniaxial direction) on the glass substrate 27, the first and second substrates being fixedly spaced from each other at a predetermined interval, and a ferroelectric or antiferroelectric liquid crystal layer (electro-optical modulating layer) 28 sandwiched between the first and second substrates.

The write-in light 29 is irradiated through the first substrate side to lower the electric resistance at a portion of the photoconductor 29 on which the light having image information is irradiated, so that an electric field at the irradiated portion is increased and thus the liquid crystal at the portion is switched. Through this switching operation of the liquid crystal, the same image as the write-in signal is obtained in the liquid crystal layer 28 of the light amplifying portion. Since the liquid crystal layer 28 is formed of ferroelectric liquid crystal, the image which has been once written in the liquid crystal layer is stored not only in the write-in operation, but also in a non-write-in operation. The intensity of the write-in light may be set to 0.5 to 5.0 mW/cm².

As shown in FIG. 5, light emitted from a light source such as a metal halide lamp 203 of 300 W is passed through dichroic mirrors 204, 205 and 206 to be spectroscopically separated (distributed) into three color (blue, green and red) lights (three light components) by the three dichroic mirrors, and then supplied to liquid crystal light shutters (optical shutters) 207, 208 and 209 for the color lights respectively. The liquid crystal light shutters comprise ferroelectric liquid crystal panels or dispersion type liquid crystal panels. One of the color lights which would be supplied to a next stage is selected by a shuttering operation (transmission and interception of light) of the shutters 207, 208 and 209. The selected one of the red, green and blue lights is converged by one of half mirrors 213, 214 and 215 and then passed through a polarizer to the second substrate side of the light amplifying portion. Thereafter, the light reflected from the liquid crystal layer is passed through an analyzer 210 to obtain a light-and-dark image. The polarizer 216 and the analyzer 210 comprises a pair of polarizing plates. The light-and-dark image thus obtained is passed through an optical system 211, e.g. a lens, and then projected on a 50-inches area screen on the wall (the size of the projection area is not limited to this size). In this case, the brightness of 200 cd/m$^2$ at maximum can be obtained for an image projected on the wall. This brightness value at the projection side is remarkably higher in comparison with the light amount at the write-in portion, and thus the substantially light amplification is performed. Therefore, a sharp color television image can be obtained on the wall with remarkably high brightness. In the above embodiment, red, green and blue colors are used as three primary colors, however, combination of other colors may be used.

DETAILED DESCRIPTION OF PREFERRED EMBODIMENTS

Preferred embodiments according to this invention will be described.

[EMBODIMENT 1]

An embodiment of the television receiver of this invention will be described hereunder. The construction of the television receiver of this embodiment is shown in FIG. 1.

A CRT having an ordinary brightness is used as a display body. An image displayed on the CRT is split into three image lights in the three directions by the half mirror 112, and then the split three image lights are passed through the light shutters 2, 3 and 4. Through the switching operation (on and off operation) of the light shutters 2, 3 and 4, the image lights which correspond to red, green and blue images are successively supplied to the light amplifying portions (cells) respectively to form an image in each of the light amplifying cells.

The construction of each of the light shutters 2, 3 and 4 will be first described.

Figure 3:
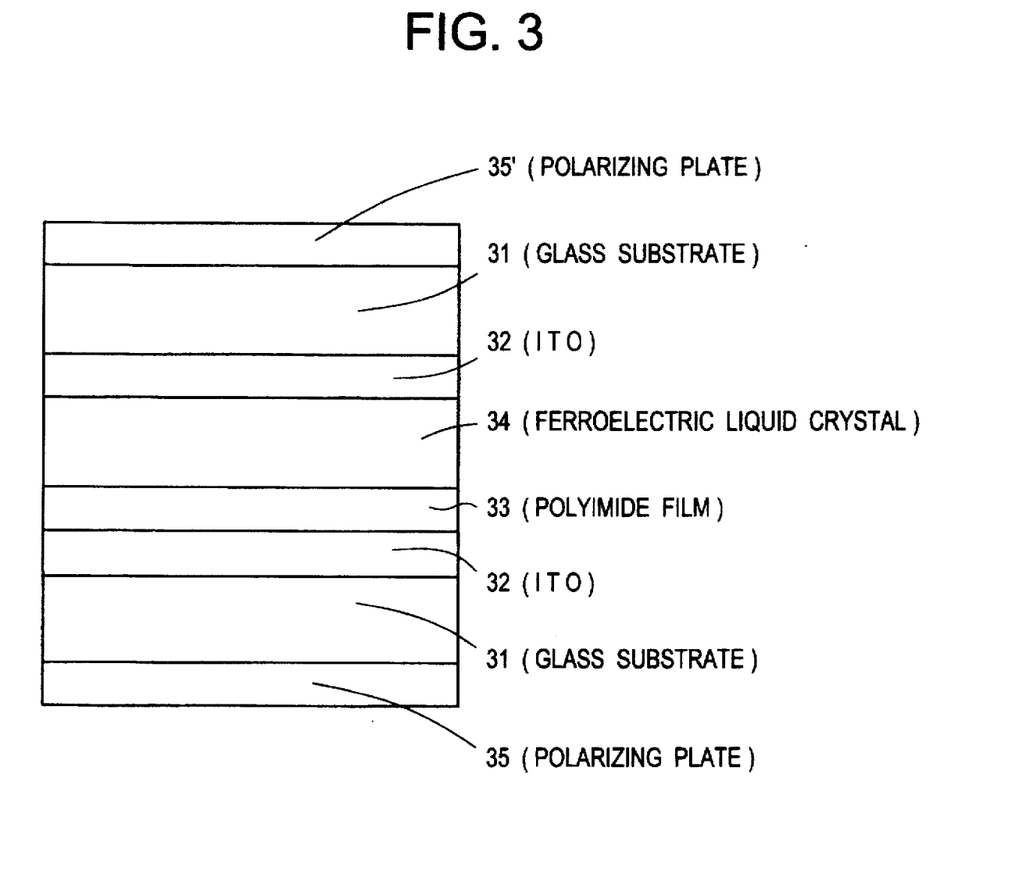
FIG. 3 shows the construction of a light shutter used in the television receiver as shown in FIG. 1.

A panel having ferroelectric liquid crystal is used as the light shutter. FIG. 3 shows the schematic construction of the panel. The ferroelectric liquid crystal panel has high-speed responsibility of about 100 microseconds, and thus it is an optimum panel as the light shutter. However, a dispersion type liquid crystal or other types may be used as the light shutter.

The light shutter used in this embodiment 1 may be produced as follows.

In FIG. 3, an ITO 32 serving as a transparent conductive film is formed in 500 to 2000 Å thickness on a transparent glass substrate 31 by a sputtering device. Thereafter, a polyimide film 33 is coated on the ITO 32 by a spinner or an off-set printing method, and then annealed at 280° C. to form an intermediate member. LQ5200 produced by Hitachi Kasei Company is used as polyimide. The intermediate member thus formed is subjected to a rubbing treatment by a roll around which a cotton velvet is wound, and then fixed to another substrate through epoxy resin so as to form a gap therebetween at an interval of 1.6 to 1.8 μm. Thereafter, ferroelectric liquid crystal 34 containing phenylpyrimidine structure is kept at about 100° C., and injected into the gap by a vacuum method. Thereafter, polarizing plates 35 and 35' are attached to the substrates to finally form a light shutter cell. The cell thus formed can provide a response speed of 1/10000 second and contrast ratio from 50:1 to 150:1 when it is driven with a rectangular-waveform voltage of 10 volts.

A method of forming the light amplifying portions 5, 6 and 7 as shown in FIG. 1 will be next described with reference to FIG. 2.

The first substrate (the write-in side substrate) may be formed as follows. An ITO 20 serving as a transparent conductive film is formed in 500 to 2000 Å thickness on a transparent glass substrate 24 in the same manner as described above. Next, a bismuth silicon oxide film serving as a photoconductor layer 21 is formed in 100 to 30000 Å on the ITO (transparent conductive film) 20 by a sputtering method or a deposition method. In this case, amorphous silicon may-be used for the photoconductor layer. The photoconductor layer has a property that the electric resistance thereof is lowered in three or four figures in response to irradiation of light. Further, a dielectric layer 22 for reflecting an incident light is formed in 1000 to 4000 Å thickness on the photoconductor 21 by a deposition method or a sputtering method.

Next, the second substrate (the read-out side substrate) is formed as follows. An ITO 25 is formed on a glass substrate 27 in the same manner as the ITO 20, and then a polyimide film serving as orientation control means 26 is formed. The polyimide film thus formed is subjected to an uniaxially orienting treatment.

The write-in side substrate and the read-out side substrate are fixed to each other so as to be spaced from each other at an interval of 1.6 to 1.8 μm. In order to keep the gap (interval) between the write-in and read-out side substrates, a Mashidama produced by Shokubai Kasei Company and comprising silicon oxide may be used as a spacer. Thereafter, ferroelectric liquid crystal material 28 whose liquid crystal molecules have optical active radicals is injected into the gap by a vacuum method to form a light amplifying cell. In the cell having the above set thickness, the color of light transmitted through the cell at the light state is white. The light amplifying cell thus formed is used.

In FIG. 1, the light emitted from the high-pressure halogen lamp 112 of 200 mW/cm$^2$ is spectroscopically separated into three red, green and blue lights by the dichroic mirrors 8, 9 and 10, and then supplied to the light amplifying portions. In the light amplifying portion, the light irradiated through the polarizer 16 is reflected in accordance with an image which has been formed in the ferroelectric liquid crystal of the light amplifying portion (light amplifying cell) in correspondence to an image of the display body 1, passed through the analyzer 19, and then converged onto an imaging mirror or an optical system 12. The converged light is projected as a projection image 13 on the wall or screen. In this case, the contrast ratio of 100 to 200 can be obtained.

The polarizer and the analyzer comprise a pair of polarizing plates 16 and 19 whose polarizing directions are deviated from each other by 90 degrees. This embodiment adopts such a positional relationship that the polarizing plates are deviated by 90 degrees, however, may adopt another positional relationship. The polarizing plates (18 and 15, 17 and 14) comprise a polarizer and an analyzer having the same construction as described above.

An example of a driving waveform for actually driving the television receiver of this embodiment and responsibility of the cell will be described with reference to FIG. 4. Each of R, G and B as shown in FIG. 4 represents each of lights which are spectroscopically separated by any one of the dichroic mirrors 8, 9 and 10.

The light shutter for the red light (R) is kept to a light-transmissible state for 5 msec with a voltage of 10 volts, and then is kept to a light non-transmissible state for 10 msec. During the light non-transmissible state of the light shutter for R, the light shutters for the green and blue lights (G and R) are successively kept to their light-transmissible states (that is, with a delay time of 5 msec as show in FIG. 4). At the same time, each of color (R, G and B) image lights of a CRT is transmitted to the light amplifying cell. Through this operation, 60 frames can be formed for one second for each of red (R), green (G) and blue (B) images.

Next, a driving method of the light amplifying cell will be described. The switching operation of the ferroelectric liquid crystal is carried out by changing an applying direction (polarity) of a driving voltage thereof, and it is necessary to write an image of a display body on real time in consideration of this fact. Therefore, the whole surface of the cell is changed to a dark state by applying a voltage of 10 volts, and then is supplied with a voltage of −5 volts. At this time, the electric resistance at a portion of the photoconductor layer to which light is irradiated is lowered, so that electric field is applied only to the light-irradiated portion of the ferroelectric liquid crystal to allow the light-irradiated portion of the liquid crystal to respond.

Figure 4:
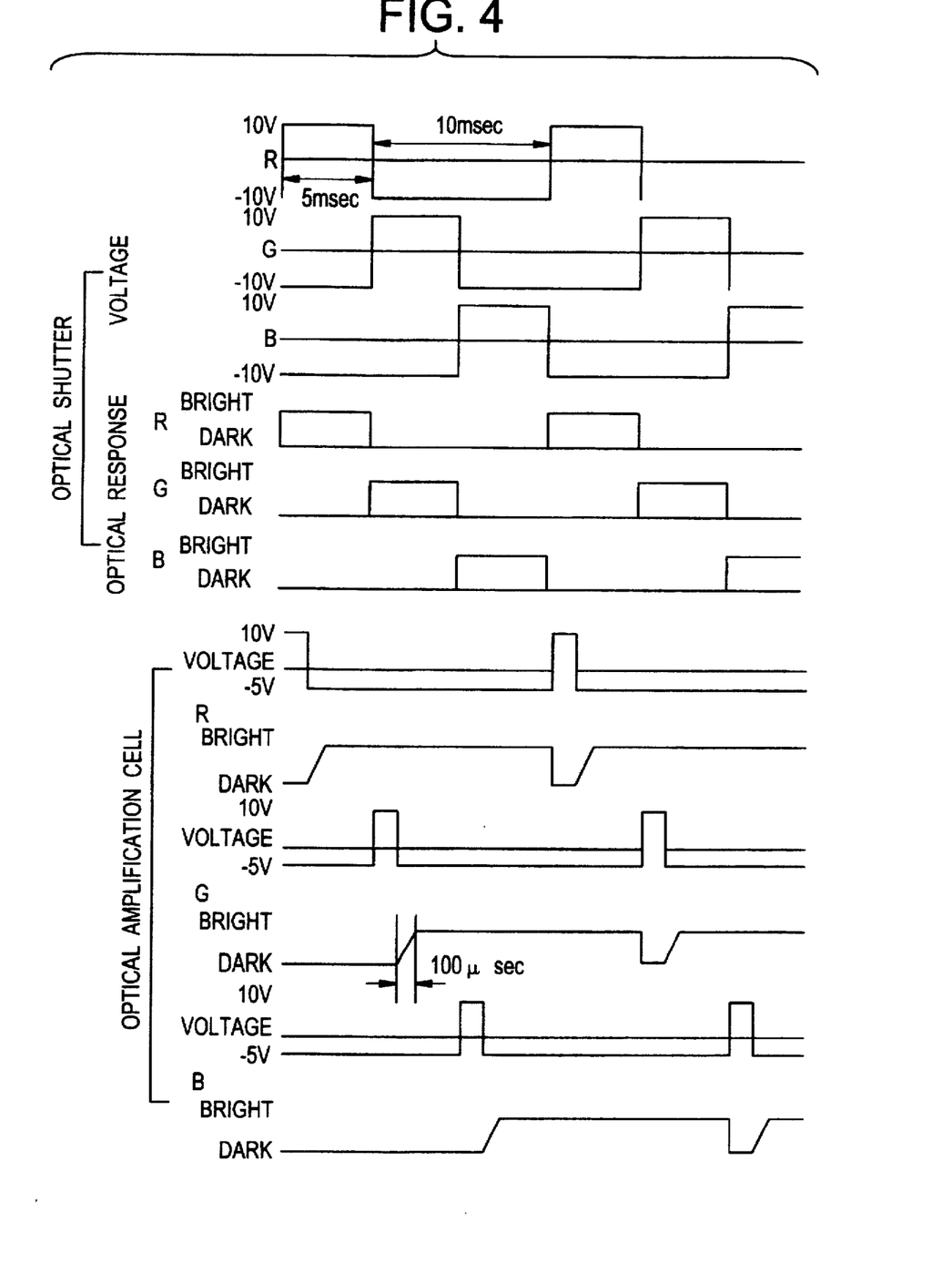
FIG. 4 shows a driving table (time chart) for the light shutter and the light amplifying cell.

The response speed of the liquid crystal in the light amplifying cell is very high (for example, about 100 μsec as shown in FIG. 4) because the liquid crystal comprises ferroelectric liquid crystal. In addition, even when the light shutter is changed from its light (open) state to its dark (close) state after a predetermined time (5 msec) elapses, an image which has been written for the predetermined time (5 msec) is not erased and stored for 15 msec immediately before a next image is written. Therefore, even when each of the light shutters for red, green and blue images is kept to its light-transmissible (open) state for only 5 msec in a period of 15 msec, each of the red, green and blue images is formed on each corresponding light amplifying cell substantially at all times because an image writing time (response time) of the light amplifying cell is very short and the image is stored (remains unerased) for 15 msec. Accordingly, a projection image can be formed with high brightness by simultaneously projecting the three color (red, green and blue) images at all times.

If nematic liquid crystal or dispersion type liquid crystal is used for the light amplifying cell, a projection image must be formed with only one color (red, green or blue) image at all times because these liquid crystals have no storing capability. Accordingly, in this case, the three color images are synthesized into a color image by successively projecting each of the color (red, green and blue) images instantaneously (for a very short time) and seeing these color images through afterimage phenomenon. On the other hand, in this embodiment, the three color images are simultaneously synthesized by simultaneously projecting the color (red, green and blue) images at all times.

[EMBODIMENT 2]

Another embodiment of this invention will be described hereunder. The construction of this embodiment is shown in FIG. 5. As a display body 201 is used a 3-inch CRT for white-and-black display with ordinary brightness. This display body 201 serves to successively display each of three color (red, green and blue) images for 5 msec to successively irradiate each of image lights of primary color images to the amplifying cell.

The construction and forming method of the light amplifying portion as shown in FIG. 2 will be next described.

The first substrate (the write-in side substrate) may be formed as follows. An ITO film 20 serving as a transparent conductive film is formed in 500 to 2000 Å thickness on a glass substrate serving as a transparent substrate 24 at the write-in side by the sputtering or deposition method. Thereafter, a bismuth silicon oxide film serving as a photoconductor layer 21 is formed on the transparent conductive film 20 by a sputtering method or deposition method. In addition, photoconductive amorphous silicon may be formed by a CVD method. These photoconductive materials have an electrical property that the electric resistance thereof is lowered in 3 to 4 figures in response to incident light.

Thereafter, an insulating dielectric film 22 and a light-reflecting film (light shielding film) 23 are formed in 1000 to 4000 Å thickness on the photoconductor layer 21 by the sputtering or deposition method. These layers serve to completely prevent each of lights incident through the write-in side and the read-out side from leaking to the other side (complete light shielding). If the light shielding is incomplete, the light having large intensity at the read-out side is unintentionally irradiated to the photoconductor layer 21 to lower the electric resistance of the photoconductor layer 21, so that the liquid crystal unintentionally responds to the read-out light.

The second substrate (the read-out side substrate) may be formed as follows. An ITO 25 is formed on a glass substrate 27, and then a polyimide film 26 is formed on the ITO 25. Thereafter, the polyimide film 26 is subjected to an uniaxially orienting treatment.

The first substrate (write-in side substrate) and the second substrate (read-out side substrate) are positionally fixed such that the gap therebetween is kept at a constant interval of 1.6 to 1.8 μm. A Mashidama produced by Shokubai Kasei Company and comprising silicon oxide may be used in order to keep the interval of the gap. Thereafter, ferroelectric liquid crystal material 28 having an optical active radical in a liquid crystal molecule thereof is injected by the vacuum method. In this case, a transmitted light through the liquid crystal in the light state is white.

As described above, an image is formed in the light amplifying portion through a light write-in operation. Upon irradiation of an image light from the display body, the electric resistance at the portion of the photoconductor layer to which the image light is irradiated is lowered, so that the electric field is applied to the light-irradiated portion of the liquid crystal layer, and the liquid crystal at the portion responds to the electric field. On the other hand, the liquid crystal at a portion to which no light is irradiated does not respond. Therefore, the same image as the display body is formed in the liquid crystal layer.

The read-out portion of the light amplifying portion will be next described with reference to FIG. 5.

Light emitted from a high-pressure halogen lamp 203 of 200 mW/cm² is passed through three dichroic mirrors 204, 205 and 206 to be spectroscopically separated into three color lights, and then one of the three color lights is selected by the shuttering operation of the light shutters 207, 208 and 209. The selected one color light is irradiated through the polarizer 216 of a polarizing plate to the second side substrate of the light amplifying portion, and reflected in accordance with the orientation direction of the liquid crystal. The reflected light is passed through the analyzer 210 of a polarizing plate to form a light-and-dark image. In this case, it is more preferable that the light shutter is disposed in front of the light amplifying cell because an image focusing operation is unnecessary and thus a manufacturing process is more easily performed.

Next, the construction of the light shutter will be described.

Figure 6:
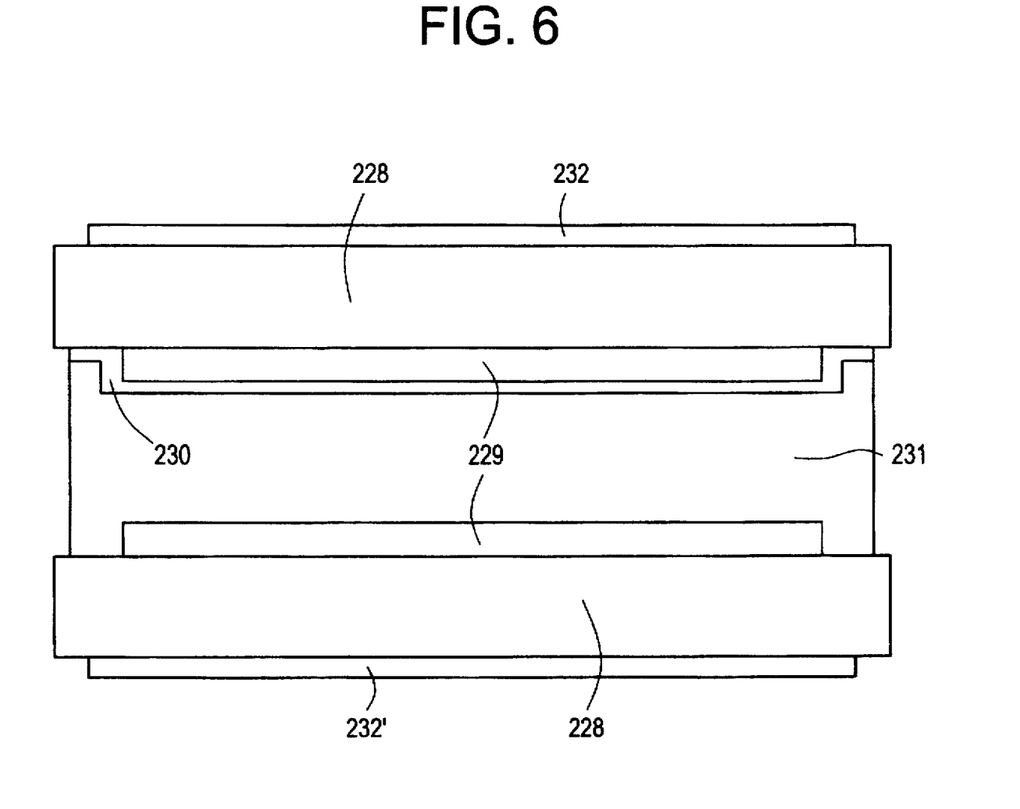
FIG. 6 shows the construction of the light shutter used in the television receiver as shown in FIG. 5.

The light shutter comprises a ferroelectric liquid crystal panel as shown in FIG. 6. The ferroelectric liquid crystal panel has high-speed responsibility of about 100 μsec, and provides an image with high contrast ratio. The high-speed responsibility is indispensable for the television receiver according to this invention, and the ferroelectric liquid crystal cell is more effective for this invention.

A method of forming the light shutter of the embodiment 2 will be hereunder described.

A transparent conductive film ITO 229 is formed in 500 to 2000 Å thickness on a transparent glass substrate 228 by the sputtering device to form an intermediate member. Two intermediate members thus formed are provided. Thereafter, a polyimide film 230 is coated on the ITO film 229 of one of the intermediate members by the spinner or the off-set printing method, and then annealed at 280° C. LQ5200 produced by Hitachi Kasei Company may be used as polyimide. The intermediate member coated with the polyimide film 230 is subjected to a rubbing treatment by a roll around which a cotton velvet is wound, and then is fixed to the other intermediate member through epoxy resin so as to form a gap (interval) of 1.6 to 1.8 μm therebetween. Thereafter, ferroelectric liquid crystal 231 containing phenylpyrimidine structure is kept at about 100° C., and injected into the gap by a vacuum method. Thereafter, polarizing plates 232 and 232' are attached to the intermediate members to finally form a light shutter cell. The cell thus formed provides response speed of 1/10000 second and contrast ratio from 50:1 to 150:1 when it is driven with a rectangular-waveform voltage of 10 volts.

A voltage waveform to be applied to each light amplifying cell and the optical responsibility of the cell in the system as described above will be described.

First, a driving method of the light amplifying cell will be described. The switching operation of the ferroelectric liquid crystal is carried out by changing an applying direction (polarity) of a driving voltage thereof, and it is necessary to write an image of a display body on real time in consideration of this fact. Therefore, the whole surface of the cell is changed to a dark state by applying a voltage of 10 volts, and then is supplied with a voltage of −5 volts. At this time, the electric resistance at a portion of the photoconductor layer to which light is irradiated is lowered, so that electric field is applied only to the light-irradiated portion of the ferroelectric liquid crystal to allow the light-irradiated portion of the liquid crystal to respond and the same image as the CRT image is formed in the liquid crystal cell. Each of the red, green and blue images is required to be successively written on the light amplifying cell for 5 msec.

The responsibility and driving waveform of the light shutter, the driving waveform of the light amplifying cell and the relationship between a projection image and a CRT image will be next described with reference to FIG. 7.

First, the light shutter for a red image light (R) is kept to a light-transmissible (open) state for 5 msec with a voltage of 10 volts. During this state, the light shutters for green and blue image lights (G and B) are kept to a light non-transmissible (close) state with a voltage of −10 volts. At this time, the light amplifying cell is irradiated with only the red image light, and thus a red image is displayed on the wall. Thereafter, the light shutter for the green image light is kept to the light-transmissible state for next 5 msec, and the light shutters for the red and blue image lights are kept to the light non-transmissible states. At this time, a green image is displayed on the wall. As described above, the red, green and blue images are successively formed on the wall. Of course, the CRT serving as the display body displays each of the color (red, green and blue) images corresponding to the above color image lights every 5 msec in synchronism with the shuttering operation of the light shutters.

At this time, the light amplifying cell is supplied with a pulse voltage of 10 volts in a period of 5 msec, so that the image is rewritten every 5 msec. Therefore, as shown in FIG. 7, the red, green and blue images are successively formed in accordance with an image which is transmitted from the display body.

Figure 7:
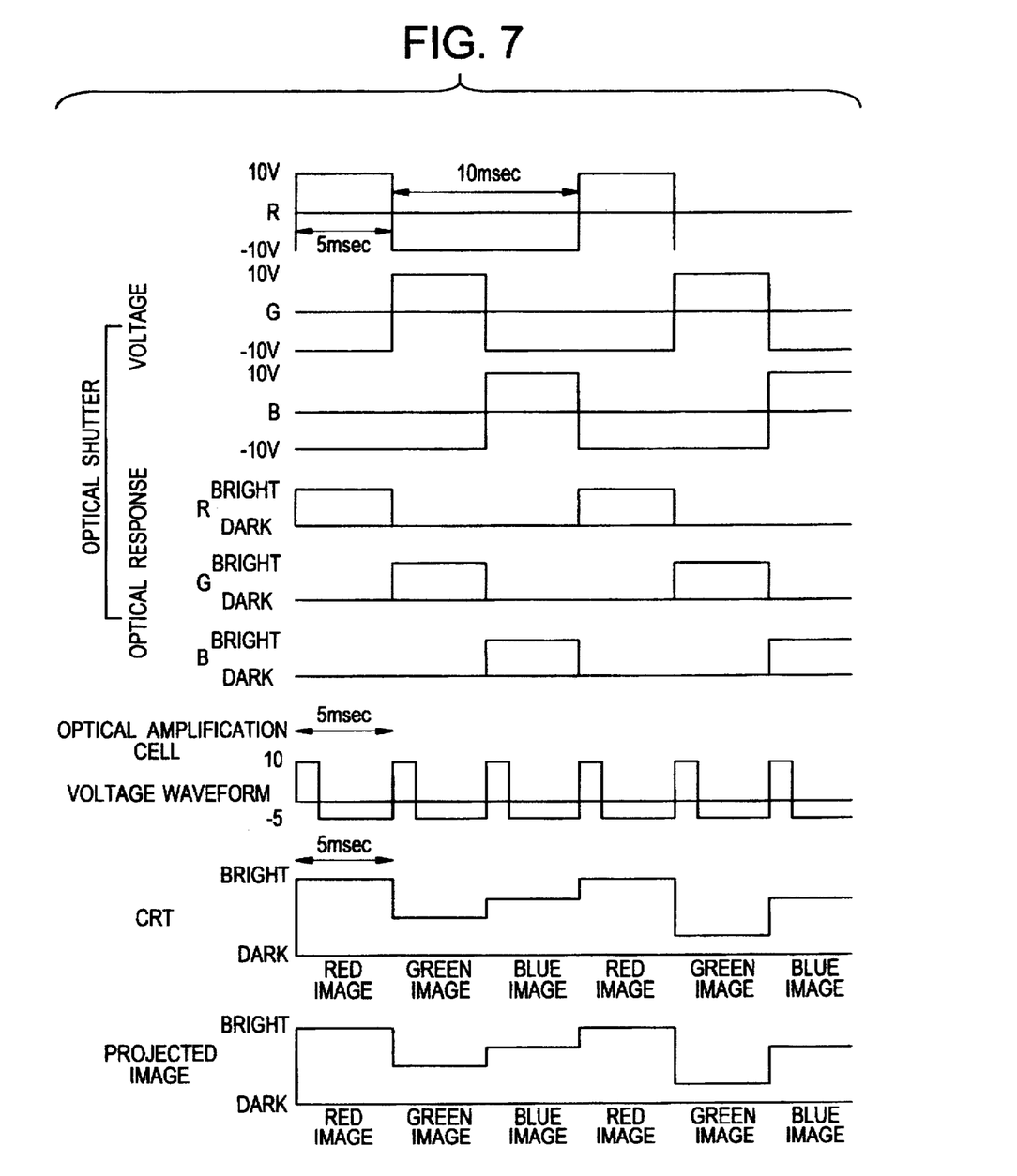
FIG. 7 shows a driving table for the light shutter and the light amplifying cell for the television receiver as shown in FIG. 5.

FIG. 7 shows a part of a response characteristic of the liquid crystal, and it is needless to say that the liquid crystal responds in accordance with the image transmitted from the display body at all positions thereof.

Through the above operation, 180 frames can be formed for each of the red, green and blue images for one second, and 60 frames can be formed for a synthesized color image of the three color images.

[EMBODIMENT 3]

In this embodiment, a liquid crystal cell having a TFT is used as the display body 1 or 201 for generating the write-in light. The liquid crystal cell has picture elements of 320× 220, but no color filter. Since no color filter is provided inside of the cell, the yield of the cell formation is relatively high. The TFT comprises a semiconductor layer of amorphous silicon or polysilicon. The liquid crystal cell thus formed is provided with a back light at the back side thereof to form a liquid crystal panel having light intensity of 5 mW/cm² and high contrast ratio of 100:1. The liquid crystal cell thus obtained is disposed at the display body 1 as shown in FIG. 1, and the whole system is driven. A bright projection image can be formed on the wall with contrast ratio of 100:1 and maximum brightness of 150 cd/cm². Further, when the liquid crystal cell of this embodiment is disposed at the display body 201 as shown in FIG. 5 and the whole system is driven, the same display effect can be obtained.

[EMBODIMENT 4]

Figure 8:
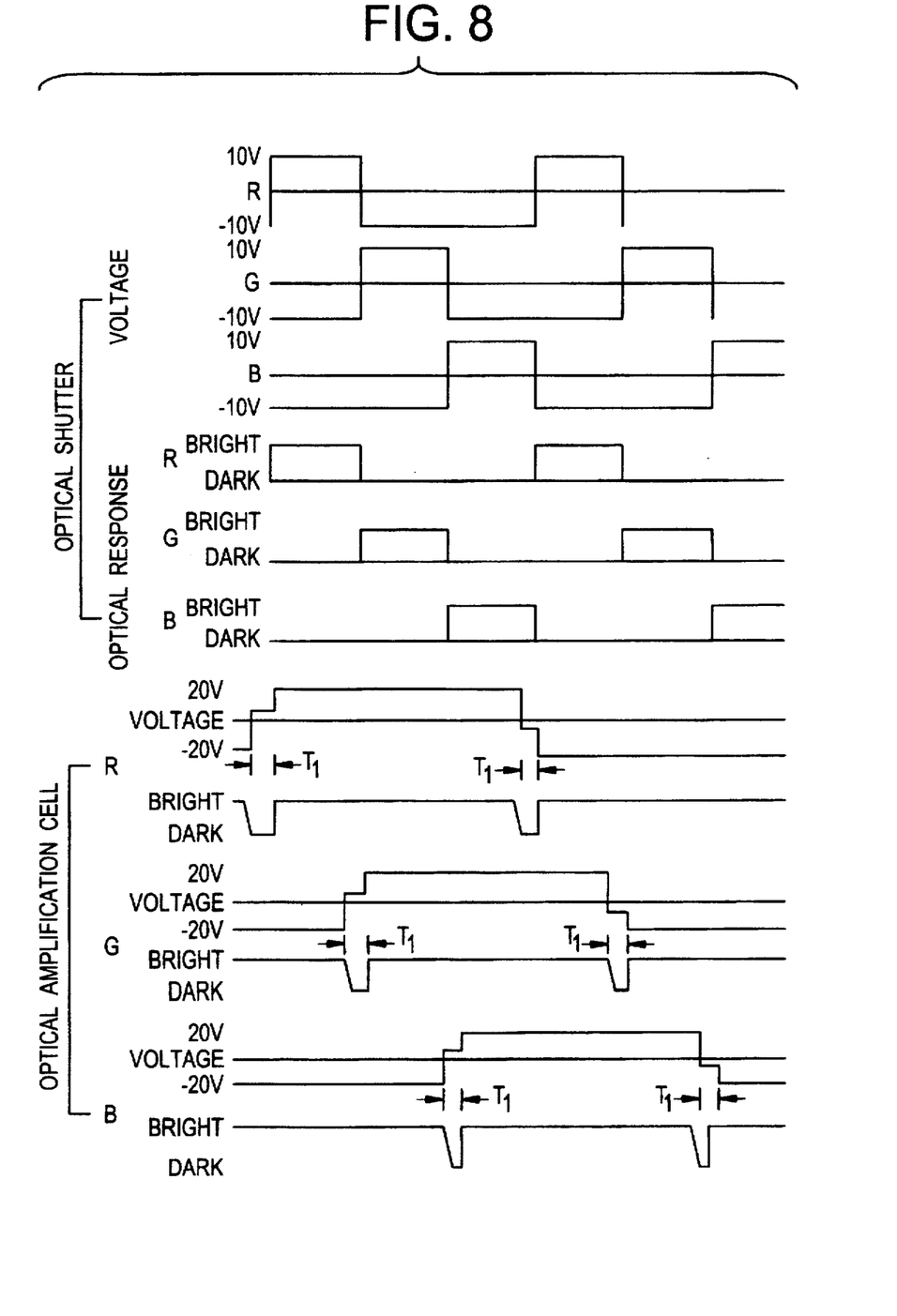
FIG. 8 shows a driving table for the light shutter and the light amplifying cell according to Embodiment 4 of the present invention.

Light amplifying portions (light amplifying cells) in accordance with the Embodiment 4 are formed in the same manner as those of Embodiment 1 except that Mashidama produced by Shokubai Kasei Company and comprising silicon oxide and having a diameter of 1.5 μm is provided between a pair of substrates as a spacer in the Embodiment 4 and a liquid crystal layer 28 in FIG. 2 comprises antiferroelectric liquid crystal in the Embodiment 4 rather than ferroelectric liquid crystal. A television receiver of the Embodiment 4 is the same as that of the Embodiment 1 except that the light amplifying portions formed in accordance with the Embodiment 4 are used as the light amplifying portions 5, 6 and 7 in FIG. 1. Driving method and optical response (BRIGHT and DARK) of the television receiver of the Embodiment 4 are shown in FIG. 8. The optical shutter (light shutter) is driven in the same way as in the Embodiment 1. When 20 V or −20 V voltage is applied between a pair of ITO electrodes 20 and 25 of the light amplifying cell, a large positive or negative voltage is applied to a portion of the antiferroelectric liquid crystal layer 28 overlapping a portion of the photoconductor 21 to which light is irradiated, and a voltage of small absolute value is applied to a portion of the antiferroelectric liquid crystal layer 28 overlapping a portion of the photoconductor 21 to which light is not irradiated. As a result, an image light emitted from the display body 1 is split into three lights of red, green and blue images by the mirror body 112, and these red, green and blue images are formed on the antiferroelectric liquid crystal layers 28 of the light amplifying cells 5, 6 and 7, respectively. These red, green and blue images continue to be displayed until a voltage is applied between the electrodes 20 and 25 during a period $T_1$ as shown in FIG. 8. This is because the antiferroelectric liquid crystal has hysteresis or is non-volatile. A voltage having a small absolute value is applied between the pair of electrodes 20 and 25 during a period $T_1$ as shown in FIG. 8. A voltage having a small absolute value is then applied to the whole of the antiferroelectric liquid crystal layer 28. The whole of the antiferroelectric liquid crystal layer 28 to which the voltage having a small absolute value is applied becomes dark. The whole of the antiferroelectric liquid crystal layer 28 can become dark by applying zero voltage between the pair of electrodes 20 and 25. However, the time required to change the antiferroelectric liquid crystal layer from bright to dark is shortened by applying a small positive voltage between the electrodes 20 and 25 during a period $T_1$ in case of changing the voltage applied therebetween from −20 V to 20 V as shown in FIG. 8. The time required to change the antiferroelectric liquid crystal layer from bright to dark is shortened by applying a small negative voltage between the electrodes 20 and 25 during a period $T_1$ in case of changing the voltage applied therebetween from 20 V to −20 V as shown in FIG. 8. In FIG. 8, voltage of the optical amplification cell (light amplifying cell) is a voltage applied between the electrodes 20 and 25.

[EMBODIMENT 5]

Figure 9:
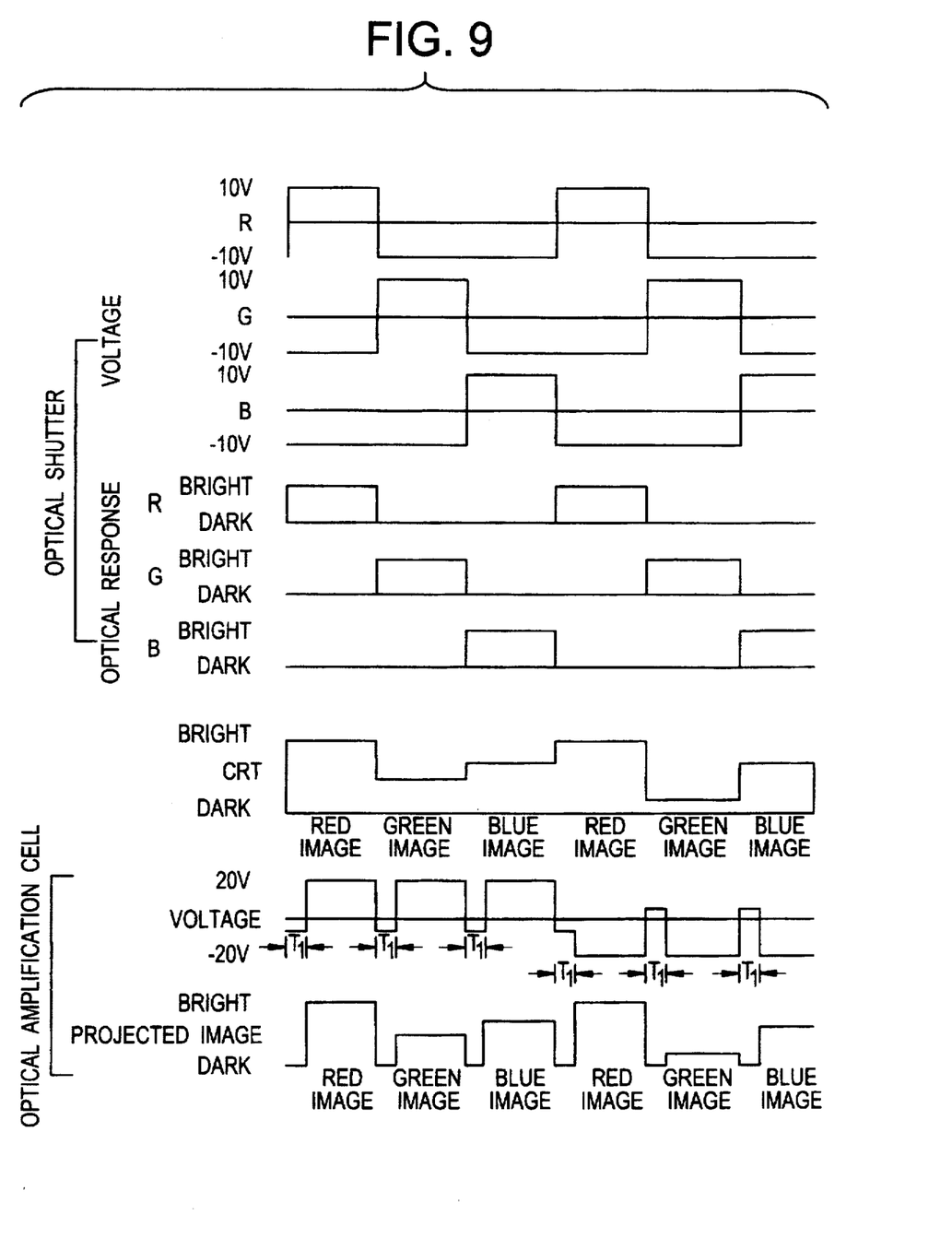
FIG. 9 shows a driving table for the light shutter and the light amplifying cell according to Embodiment 5 of the present invention.

A television receiver of Embodiment 5 is the same as that of the Embodiment 2 except that the light amplifying cell in accordance with the Embodiment 4 is used as an light amplifying cell 202 in FIG. 5 in the Embodiment 5. The driving of the television receiver of the Embodiment 5 is shown in FIG. 9. 20 V, −20 V and a voltage having a small absolute value are used to drive the light amplifying cell as shown in FIG. 9. The voltage having a small absolute value is applied during a period $T_1$ to change the antiferroelectric liquid crystal layer 28 from bright to dark as shown in FIG. 9. The voltage having a small absolute value may be zero, however, it makes a higher speed operation possible that a small negative voltage is applied after 20 V between the electrodes 20 and 25 and a small positive voltage is applied after −20 V between the electrodes 20 and 25 as shown in FIG. 9 for the same reason as in the Embodiment 4. Since the light amplifying cell of the Embodiment 5 is the same as that of the Embodiment 4, the reflected light from the light amplifying cell 202 of the Embodiment 5 has a light intensity of waveform shown undermost in FIG. 9.

As described above, according to this invention, a projection type television receiver which is lighter in weight and more compact can be obtained in lower cost in comparison with a conventional television receiver (CRT). Particularly, since no patterning is required for the liquid crystal light shutter and the light amplifying cell, the problem of the yield in the prior art can be solved. In addition, this invention has an advantage that a projection type of CRT which can be manufactured in low cost can be used.

In the Embodiments 4 and 5, the light amplifying cell has only one uniaxially orienting layer 26 (orientation control means), however, two uniaxially orienting layers can be provided in one light amplifying cell, sandwiching the antiferroelectric liquid crystal layer therebetween.

What is claimed is:

1. An electro-optical device comprising:
   a light source for emitting light;
   a light shutter means comprising a plurality of liquid crystal devices;
   means for dividing said light emitted from said light source into a plurality of color lights and directing said color lights onto said plurality of liquid crystal devices, respectively;
   a light amplifying liquid crystal device comprising at least a photoconductive layer, a liquid crystal layer adjacent to said photoconductive layer and a light reflective layer therebetween, said liquid crystal layer comprising an antiferroelectric liquid crystal;
   an image light outputting means comprising an active matrix liquid crystal device using thin film transistors, for directing an image light onto said light amplifying liquid crystal device from the photoconductive layer side; and
   means for directing said plurality of color lights transmitted through said plurality of liquid crystal devices onto said light amplifying liquid crystal device from the liquid crystal layer side.

2. The device of claim 1 wherein resistance of said photoconductive layer is decreased in response to incidence of a light thereon.

3. The device of claim 1 wherein said plurality of liquid crystal devices of the light shutter means comprise ferroelectric liquid crystal devices or dispersion type liquid crystal devices.

4. The device of claim 1 wherein said plurality of color lights are red, green, and blue.

5. The device of claim 1 further comprising a means for directing said plurality of color lights reflected on said light amplifying liquid crystal device onto a screen.

6. The device of claim 1 wherein said image light outputting means includes image light sequencing means for sequentially and repetitively directing an output onto said light amplifying liquid crystal device representing one of a plurality of color portions of an image corresponding to one of said color lights.

7. The device of claim 6 wherein said light shutter means further comprises shutter sequencing means for sequentially activating each of said plurality of liquid crystal devices in the light shutter means to sequentially apply said plurality of color lights to said light amplifying liquid crystal device in synchronism with said sequential color portion output of said image light sequencing means.

8. The device of claim 7 wherein said shutter sequencing means and said image light sequencing means sequentially actuate to transmit red, green, and blue image portions at intervals of about 5 ms.

9. An electro-optical device comprising:

an image light outputting means for emitting image light;

a light amplifying means comprising at least one liquid crystal device having at least a photoconductive layer, a liquid crystal layer adjacent to said photoconductive layer with a light reflecting layer therebetween, and a pair of electrodes for supplying a voltage across said photoconductive layer and liquid crystal layer, said liquid crystal layer comprising an antiferroelectric liquid crystal;

means for directing the image light onto said light amplifying means from the photoconductive layer side;

a light source means for emitting a plurality of color lights onto said light amplifying means from the liquid crystal layer side; and a light polarizing means placed on the passage between said light source means and said light amplifying means, wherein said image light outputting means comprises an active matrix liquid crystal device using TFT's.

10. The device of claim 9 wherein resistance of said photoconductive layer is decreased in response to incidence of a light thereon.

11. The device of claim 9 wherein said light source means includes a light shutter means having a plurality of liquid crystal devices for selectively passing one of said plurality of color lights, where said plurality of liquid crystal devices of the light shutter means comprise ferroelectric liquid crystal devices or dispersion type liquid crystal devices.

12. The device of claim 9 wherein said plurality of color lights are red, green, and blue.

13. The device of claim 9 further comprising a means for directing said plurality of color lights reflected on said light amplifying means onto a screen.

14. The device of claim 9 wherein said image light outputting means includes image light sequencing means for sequentially and repetitively directing an output onto said liquid crystal device of said light amplifying means representing one of a plurality of color portions of an image corresponding to one of said color lights.

15. The device of claim 14 wherein said light source means includes a light shutter means having a plurality of liquid crystal devices for selectively passing one of said plurality of color lights, and said light shutter means further includes shutter sequencing means for sequentially activating each of said plurality of liquid crystal devices in the light shutter means to sequentially apply said plurality of color lights to said light amplifying liquid crystal device in synchronism with said sequential color portion output of said image light sequencing means.

16. The device of claim 15 wherein said shutter sequencing means and said image light sequencing means sequentially transmit red, green, and blue image portions at intervals of about 5 ms.

* * * * *